US007046388B1

(12) United States Patent
Shibata

(10) Patent No.: US 7,046,388 B1
(45) Date of Patent: May 16, 2006

(54) PRINTING SYSTEM

(75) Inventor: Koichi Shibata, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/520,792

(22) Filed: Mar. 8, 2000

(30) Foreign Application Priority Data

Mar. 9, 1999 (JP) ................................ 11-061330

(51) Int. Cl.
*G06F 13/00* (2006.01)
*G06F 15/00* (2006.01)

(52) U.S. Cl. ...................... 358/1.18; 358/1.9; 715/526; 715/527

(58) Field of Classification Search ............... 358/1.18, 358/1.9, 3.23, 1.13; 283/56, 115; 715/526, 715/527
See application file for complete search history.

(56) References Cited

U.S. PATENT DOCUMENTS 5,734,915 A * 3/1998 Roewer ...................... 715/512
5,844,688 A * 12/1998 Shimizu et al. ............. 358/296
5,933,589 A * 8/1999 Hidaka et al. ............. 358/1.18
6,191,870 B1 * 2/2001 Takayanagi ................. 358/450
6,208,429 B1 * 3/2001 Anderson .................. 358/1.18
6,313,919 B1 * 11/2001 Nakagiri et al. ........... 358/1.11
6,473,196 B1 * 10/2002 Usami et al. .............. 358/1.18
6,493,108 B1 * 12/2002 Hirai ......................... 358/1.18
6,757,073 B1 * 6/2004 Kuroda ....................... 358/1.2
2001/0013938 A1 * 8/2001 Usami et al. ................ 358/1.9

FOREIGN PATENT DOCUMENTS

| | | | |
|---|---|---|---|
| JP | 5011948 | | 1/1993 |
| JP | 8-197808 | | 8/1996 |
| JP | 08197808 | * | 8/1996 |
| JP | 8-292684 | | 11/1996 |
| JP | 9305584 | | 11/1997 |
| JP | 10083263 | | 3/1998 |

* cited by examiner

*Primary Examiner*—Edward Coles
*Assistant Examiner*—Alan Rahimi
(74) *Attorney, Agent, or Firm*—Morrison & Foerster LLP

(57) ABSTRACT

An object of the present invention is to provide a printing system capable of outputting print of a style desired by the user without any waste of sheets. In a printing system according to the present invention achieving this object, a plurality of different output styles corresponding to print contents are stored in a memory (106, 214), a print content to be image-formed is specified by a specifying unit (102, 107, 108, 213), image data is converted into the output style corresponding to the specified print content by a controller (104, 211), and image formation is performed by an image forming unit (220) based on the converted data. Output styles may be stored so that the user can select thereamong.

18 Claims, 5 Drawing Sheets

FIG. 2

| PRINT CONTENS | OUTPUT STYLES |
|---|---|
| EXPERIMENTAL RESULT REPORT | ONLY THE FRONT COVER IS 1UP AND THE OTHER PAGE ARE 2UP. |
| MEETING MATERIAL | THE ODD-NUMBERED PAGE ARE PRINTED AT LOW RESOLUTION AND THE EVEN-NUMBERED PAGE ARE PRINTED AT HIGH RESOLUTION. |
| DOCUMENT GIVEN OUT TO CUSTOMERS | FRONT AND BACK COVER ARE 1UP-PRINTED ON A SINGLE-SIDE AND THE OTHER PAGE ARE 1UP-PRINTED ON DOUBLE-SIDES. |

PRINTING SYSTEM

CROSS-REFERENCE TO RELATED APPLICATIONS

This application is based on Application No. HEI 11-061330 filed in Japan, the content of which is hereby incorporated by reference.

BACKGROUND OF THE INVENTION

1. Field of the Invention

The present invention relates to a printing system and an output device capable of arbitrarily changing the image output style as desired by the user, a method therefor, and a program product storing a program therefor.

2. Description of the Related Art

There are cases where each user desires a different output style, for example, in making a hard copy of an original which the user has prepared. Moreover, there are cases where a user desires a different output style for each page. In such cases, in outputting and copying all the print pages, the output style is manually changed; for example, the front cover is copied on single-side of a sheet, and the other pages are copied on double-sides or a plurality of pages are copied being scaled down on one sheet. Here, the page refers to the number of pages of the original image data (this applies hereafter). That is, the number of pages of the original image data does not always the same as that of the output matter.

On the other hand, an output device has been proposed which is capable of reducing the consumption of toner and recording paper by, in making a plurality of copies of an original, making only one normal-size copy of the original and making the other copies so that the original is scaled.

However, the output device described in the prior art requires all the pages of the print, which is the original, to be output once, so that sheets are wasted in accordance with the amount of the original. In addition, this output device cannot meet the demand that each page be output in a different style.

SUMMARY OF THE INVENTION

In view of the problems, an object of the present invention is to provide a printing system and an output device capable of outputting print of a style desired by the user without any waste of sheets, a method therefor, and a program product storing a program therefor.

Accordingly, a printing system according to the present invention comprises: a data processor; an output device including an interface for receiving data from the data processor and an image forming unit for forming an image on a sheet of paper; a memory for storing a plurality of different output styles corresponding to print contents; a specifying unit for specifying a print content to be image-formed; and a controller for converting the data into an output style corresponding to the specified print content. The image forming unit performs image formation based on the converted data.

A feature of the present invention is that output styles corresponding to print contents are previously stored and when a print content is specified, image data is converted into the corresponding output style to perform image formation. This enables print of a desired style to be obtained without the need to print all the print pages once.

Output styles include normal printing (hereinafter, referred to as 1UP printing), printing where two pages are image-formed being scaled down on one sheet (hereinafter, referred to as 2UP printing), printing where four pages are image-formed being scaled down on one sheet (hereinafter, referred to as 4UP printing), double-sided printing, high-resolution printing, and low-resolution printing. Print contents refer to uses of output matters such as a report on an experiment, a material for a meeting, a document given out to a customer, an original copy and a duplicate.

While output styles corresponding to print contents are previously stored and a print content is specified to image-form it in a desired output style, the user may select an output style for each print page.

That is, a printing system according to the present invention comprises: a data processor; an output device including an interface for receiving data from the data processor and an image forming unit for forming an image on a sheet of paper; a memory for storing a plurality of different output styles; a specifying unit for specifying an output style for each print page; and a controller for converting the data into the specified output style. The image forming unit performs image formation based on the converted data.

Here, the memory, the specifying unit and the controller may be provided in either of the data processor and the output device, or all of the memory, the specifying unit and the controller may be provided in the output device.

That is, an output device according to the present invention comprises: an image forming unit for forming an image on a sheet of paper; a memory for storing a plurality of different output styles corresponding to print contents; a specifying unit for specifying a print content to be image-formed; and a controller for converting image data into an output style corresponding to the specified print content. The image forming unit performs image formation based on the converted data.

Moreover, an output device according to the present invention comprises: an image forming unit for forming an image on a sheet of paper; a memory for storing a plurality of different output styles; a specifying unit for specifying an output style for each print page; and a controller for converting image data into the specified output style. The image forming unit performs image formation based on the converted data.

Moreover, installing a printer driver (software) in the data processor or the output device produces effects similar to those of the printing systems of the present invention.

That is, according to the present invention, a computer-readable program product storing a program for controlling a printing system can be provided. The computer-readable program product stores a program for converting image data into an output style corresponding to a specified print content, and performing image formation.

Moreover, according to the present invention, a computer-readable program product storing a program for controlling a printing system can be provided. The computer-readable program product stores a program for converting image data into an output style specified for each print page, and performing image formation.

According to the present invention, since image formation is performed with image data being converted into an output style desired by the user, it is unnecessary to output the original once, so that waste of sheets can be prevented. Moreover, since the user can select an output style which he or she desires, utilization of, for example, the 2UP printing, the 4UP printing or the double-sided printing reduces the number of prints, so that when an ejection bin is used, the bin capacity can be saved. This prevents ejection bin full error which can be caused particularly in an output device generally having a small bin capacity.

Moreover, enabling low-resolution printing to be selected reduces not only the printout time but also toner consumption, and the reduction can be specified in fine steps.

BRIEF DESCRIPTION OF THE DRAWINGS

These and other objects and features of the present invention will become apparent from the following description of the preferred embodiments thereof taken in conjunction with the accompanying drawings, in which:

FIG. 2 shows examples of print contents and corresponding output styles;

In the following description, like parts are designated by like reference numbers throughout the several drawings.

DETAILED DESCRIPTION OF THE PREFERRED EMBODIMENTS

The preferred embodiments of the present invention are described hereinafter with reference to the accompanying drawings.

Figure 1:
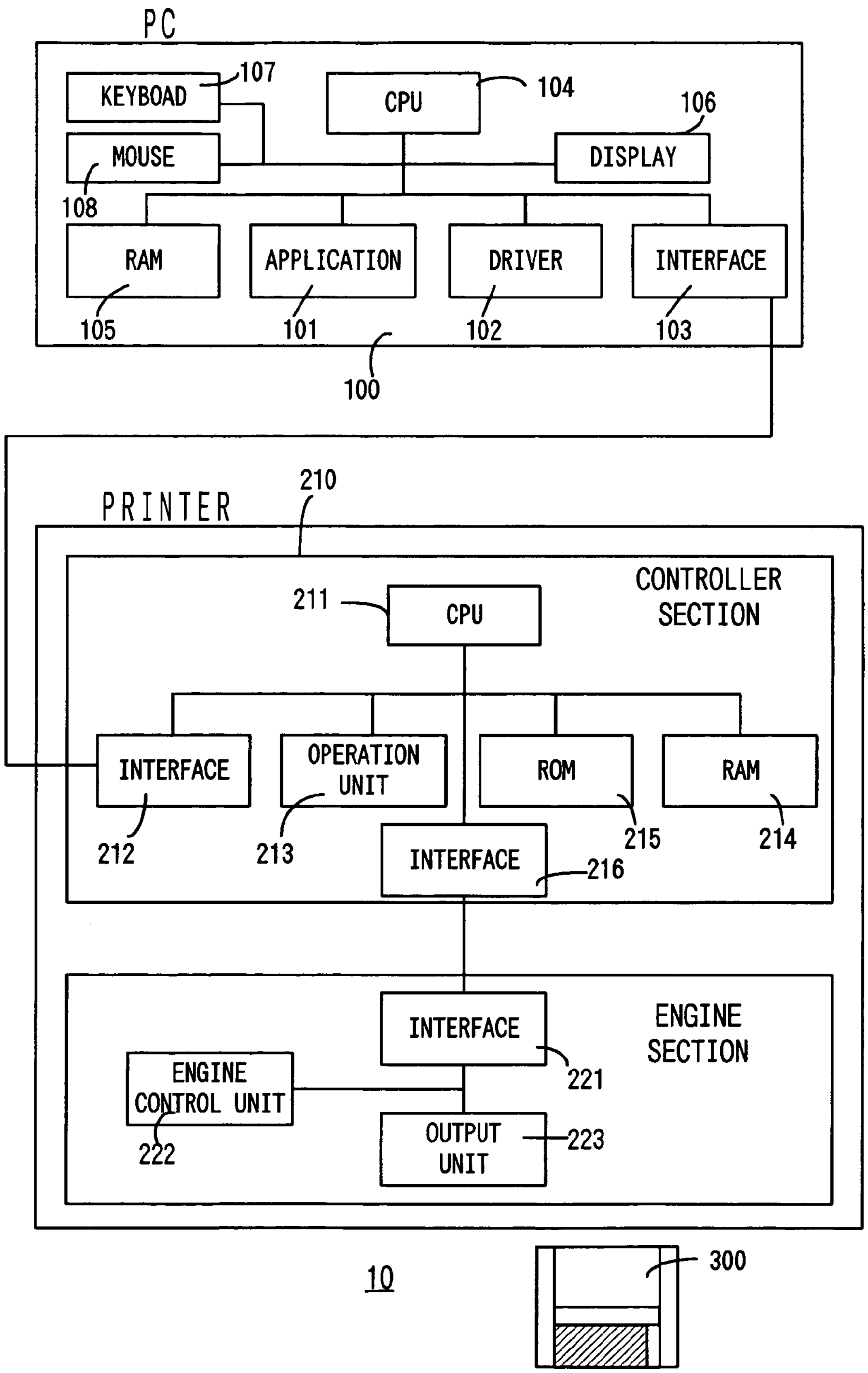
FIG. 1 shows an embodiment of a printing system according to the present invention.

The present invention will be detailed based on the concrete examples shown in the drawings. FIGS. 1 to 4 show a preferred embodiment of a printing system according to the present invention. FIG. 1 shows the structure of a printing system 10 of this embodiment. In FIG. 1, a host computer (data processor) 100 and a printer (output device) 200 are connected by a signal line. The host computer 100 sends image data to the printer 200 to perform printing.

The host computer 100 includes an application unit 101, a printer driver unit 102, an interface 103, a central processing unit (CPU) 104, a random-access memory (RAM) 105, a display 106, a keyboard 107 and a mouse 108. In response to an instruction of the CPU 104, the application unit 101 manages the data and the number of pages of an original. The printer driver unit 102 receives data from the application unit 101, and calculates the total number of print pages based on the information. The printer driver unit 102 also converts the data received from the application unit 101 into a language which a controller section 210 of the printer 200 can interpret, and adds information on the print content or the output style which the user has specified with the keyboard 107 and the mouse 108. The interface 103 sends the converted data and the added information on the print content or the output style to the printer 200.

The printer 200 includes the controller section 210 and an engine section 220. The controller section 210 includes an operation unit 213, a CPU (controller) 211, a RAM (memory) 214, a read-only memory (ROM) 215, and interfaces 212. The interface 212 receives the data from the interface 103 of the host computer 100. The CPU (controller) 211 analyzes the received data, reads the output style specified by the user from the RAM (memory) 214, and expands image data into a data format (bit map data) which the engine section 220 can interpret. The interface 215 sends the data to the engine section 220.

The engine section (image forming unit) 220 includes an interface 221, an engine control unit 222, and an output unit 223. The interface 221 receives the data from the interface 215. The output unit 223 prints the image data onto paper under the control of the engine control unit 222.

A floppy disk 300 is a program product storing software to be installed in the printer 200. The floppy disk 300 stores a processing in the printer 200 described later with reference to FIG. 4. Installing it in the printer 200 enables the printing system 10 to perform the processing shown in FIG. 4.

FIG. 2 shows examples of print contents and corresponding output styles in the present invention. For example, when the experimental result report which is a print content is specified, the output style is such that only the front cover is 1UP-printed and the other pages are 2UP-printed. When the meeting material is specified, the output style is such that the odd-numbered pages are printed at low resolution and the even-numbered pages are printed at high resolution. The user can specify the print content on a screen of the printer driver unit 102 of the host computer 100 by operating the keyboard 107 and the mouse 108. Print contents and corresponding output styles are previously stored in the RAM 214 of the printer 200.

Figure 3:
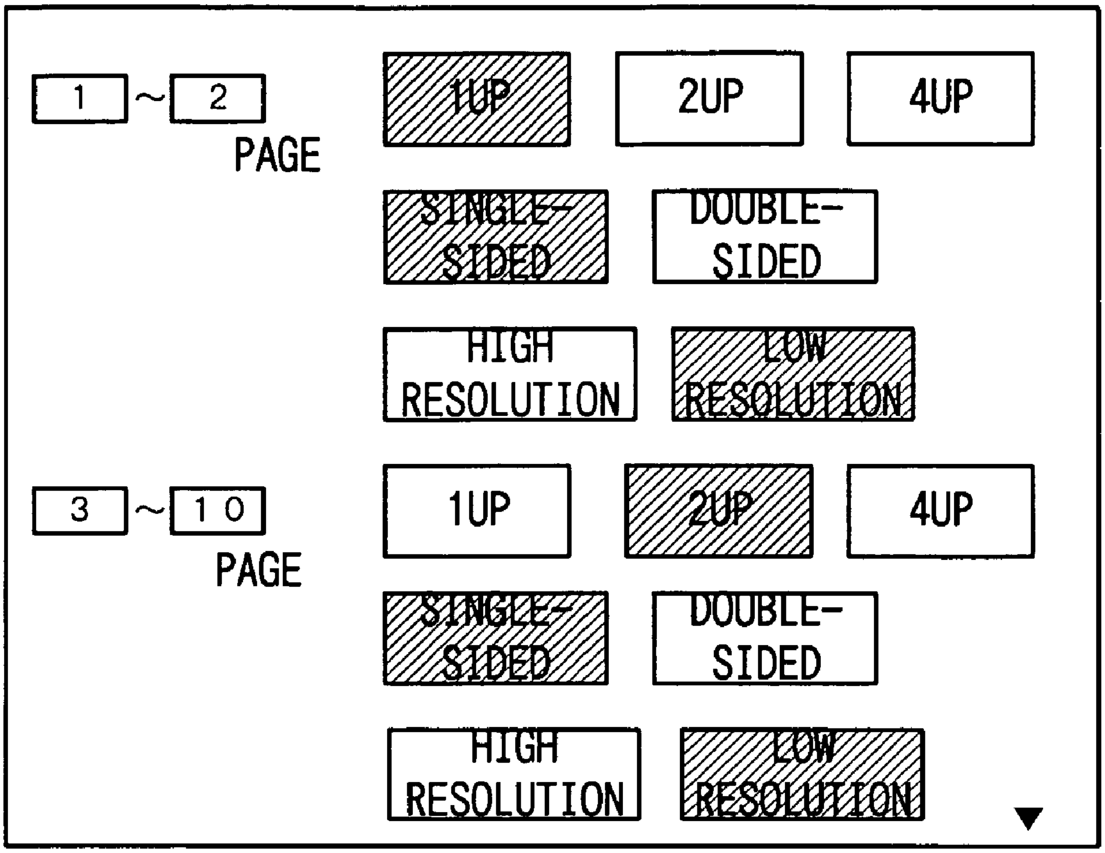
FIG. 3 shows an example of output styles varying among pages.

FIG. 3 shows an example of output styles varying among pages in the present invention. This figure shows a screen of the printer driver unit 102 provided on the display 106 of the host computer 100 in this embodiment. The first and the second pages are 1UP-printed on single-side at low resolution. The third to the tenth pages are 2UP-printed on single-side at low resolution. The user can specify such output styles varying among pages on the screen of the printer driver unit 102 of the host computer 100 by operating the keyboard 107 and the mouse 108.

Figure 4:
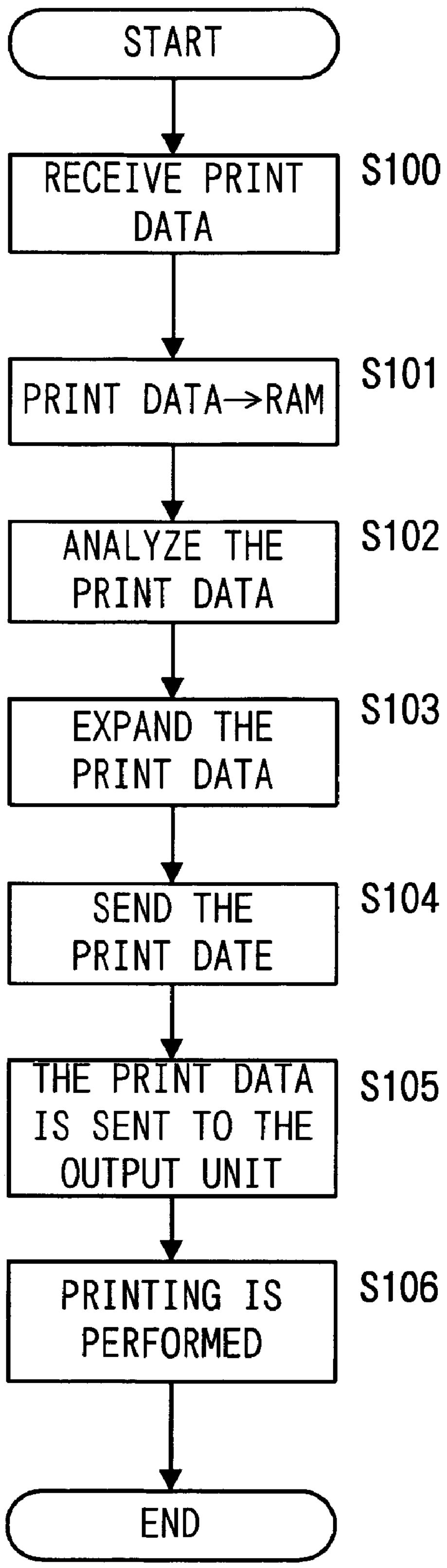
FIG. 4 shows a flowchart of a control processing in a printer in the embodiment.

FIG. 4 shows a flow chart of the control processing in the printer 200. When the processing is started, in the controller section 210, the interface 212 receives print data from the host computer 100, and the data is temporarily stored in the RAM 214 under the control of the CPU 211 (steps S100 and S101). Then, the CPU 211 analyzes the data in the RAM 214 and the print content, shown in FIG. 2, specified by the user or the output styles varying among pages shown in FIG. 3 (step S102), expands the print data into bit map data in accordance with the corresponding output style (step S103), and sends the data from the interface 215 to the interface 221 of the engine section 220 (step S104).

In the engine section 220, when the print data is received, the print data is sent to the output unit 223 under the control of the engine control unit 222 (step S105) and printing is performed (step S106). Then, the processing is ended.

Figure 5A:
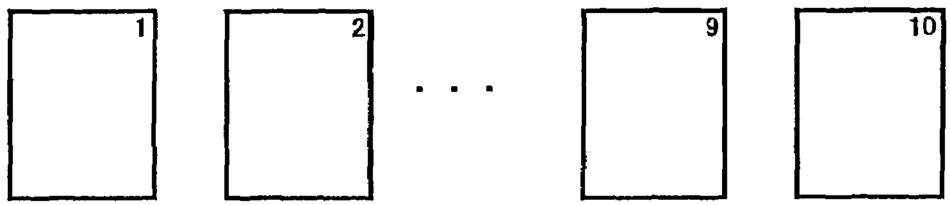
FIGS. 5(*a*) to 5(*c*) show examples of output styles obtained by the embodiment.
Figure 5B:
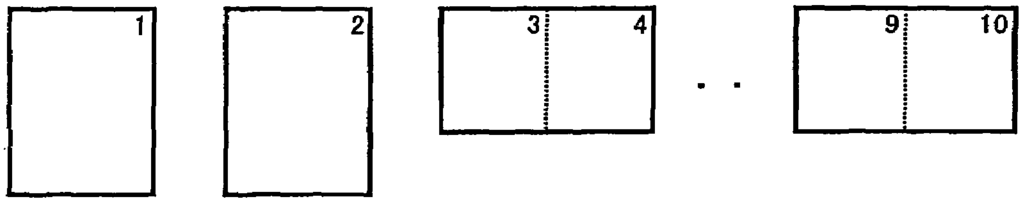
Figure 5C:
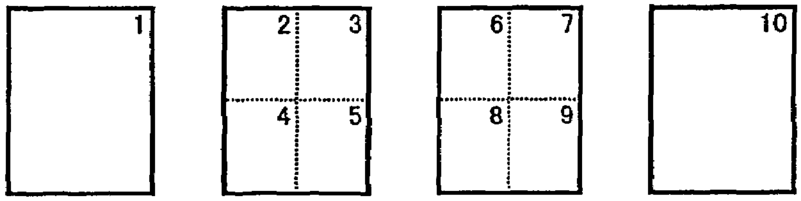

FIGS. 5(*a*) to 5(*c*) show original image data and examples of outputs produced when output styles varying among pages are specified. FIG. 5(*a*) shows original image data where all of the first to the tenth pages are 1UP-printed. FIG. 5(*b*) shows an output produced when the 1UP printing is specified as the output style of the first and the second pages and the 2UP printing is specified as the output style of the third to the tenth pages. FIG. 5(*c*) shows an output produced when the 1UP printing is specified as the output style of the first and the tenth pages and the 4UP printing is specified as the output style of the second to the ninth pages.

While a printing system according to the embodiment has been described, it should be noted that the present invention is not limited to the above-described embodiment; each of the memory, the specifying unit and the controller may be provided in either of the data processor and the output device.

For example, all of the memory, the specifying unit and the controller may be provided in the printer 200. In this case, a plurality of output styles corresponding to print contents are stored in the RAM 214 of the printer 200. The CPU 211 converts the image data into the output style corresponding to the print content specified with the operation unit 213, and image formation is performed based on the converted data.

As another example, all of the memory, the specifying unit and the controller may be provided in the host computer 100. In this case, a plurality of output styles corresponding to print contents are stored in the RAM (memory) 105 of the host computer 100. The CPU (controller) 104 converts the image data into the output style corresponding to the print content specified by the printer driver unit (specifying unit) 102, and image formation is performed based on the converted data.

Further, the software on the floppy disk 300 may be installed in the host computer 100 to enable the printing system 10 to perform the processing shown in FIG. 4.

While any data processor that processes signals to output image data may be used, a host computer is generally used. The number of data processors may be either one or more than one. Any output device that is capable of image formation may be used; for example, a printer or a copier may be used. The number of output devices may be either one or more than one. The data processor and the output device may be connected by any means; for example, they may be connected by a network line. The output device has an ejection bin. The number of ejection bins may be either one or more than one.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A printing system for printing multiple copies of document image data, comprising:

a selecting unit for selecting a mode in which at least two original image data are printed on one sheet of paper and single original image data is printed on a separate sheet of paper; and an image forming unit for forming at least two images on one sheet of paper based on said at least two original image data and forming a single image on a separate sheet of paper based on said single original image data according to said selected mode, wherein a user selects which image data are printed on a sheet of paper as a single original image and which image data are printed on a sheet of paper having at least two original image data printed thereon.

2. A printing system as claimed in claim 1, wherein said at least two images are formed side by side on one sheet of paper.

3. A printing system as claimed in claim 1, wherein one of said at least two images is formed on a front side of said one sheet of paper and another of said at least two images is formed on a back side of said one sheet of paper.

4. A printing system as claimed in claim 1, wherein images are formed on a plurality of sheets of paper, such that at least two images are formed on a first sheet of paper and at least two images are formed on a last sheet of paper, and only one image is formed on each of the remaining sheets of paper.

5. A printing system as claimed in claim 1, wherein images are formed on a plurality of sheets of paper, such that one image is formed on a first sheet of paper and at least two images are formed on each of the remaining sheets of paper.

6. A printing system as claimed in claim 1, wherein said selecting unit includes a specifying unit for specifying a first page number of the original image data and a last page number of the original image data during which at least two original image data are printed on one sheet of paper.

7. A printing system as claimed in claim 1, wherein said selecting unit comprises a specifying unit for specifying said mode from a plurality of modes, wherein each of the plurality of modes includes a different set of output styles.

8. A method of printing multiple copies of a document, such that the copies have a different format than an original document being copied, wherein the original document comprises a plurality of original images, each original image representing a sheet of the original document, and the multiple copies each comprise a plurality of sheets on which are printed the plurality of images of the original document, the method comprising:

storing a plurality of formats in a memory, the plurality of formats comprising, a first format wherein at least one original image is printed on a front side of at least one of the sheets of the copies, and at least one original image is printed on a back side of at least one sheet of the copies, a second format wherein the front side of at least one sheet of the copies is printed with multiple original images, and the back side of at least one sheet of the copies is printed with at least one original image, a third format wherein the front side of at least one sheet of the copies is printed with one original image, and the back side of at least one of the copies is printed with multiple original images, selecting one of the stored formats; and printing the multiple copies in the selected format.

9. The method of claim 8, wherein the plurality of formats further comprise a fourth format, wherein a last sheet of the copies is printed with multiple original images and each of the remaining sheets of the copies is printed with a single original image.

10. The method of claim 8, wherein the plurality of formats further comprise a fifth format, wherein each of the plurality of sheets of the copies is printed with multiple original images.

11. The method of claim 8, wherein the plurality of formats further comprise a sixth format, wherein a first sheet of the copies is printed with a single original image, and the remaining sheets of the copies are printed with multiple images.

12. The method of claim 8, wherein the plurality of formats further comprise a seventh format, wherein a first sheet of the copies and a last sheet of the copies are each printed with a single original image, and the remainder of the sheets are each printed with multiple original images.

13. The method of claim 8, wherein the selected front sides and back sides of the sheets of the multiple copies are printed on without manually adjusting the sheets.

14. The method of claim 8, wherein a user defines additional formats, and the user defined formats are stored in the memory.

15. A method comprising:

storing software code on a computer readable medium, the software code performing the operations of;

storing an original document having a plurality of original images, wherein each original image represents a sheet of the original document, storing a plurality of print formats according to which multiple copies of the original document will be printed, the formats comprising, a first format wherein at least one original image is printed on a front side of at least one of the sheets of the copies, and at least one original image is printed on a back side of at least one sheet of the copies, a second format wherein the front side of at least one sheet of the copies is printed with multiple original images, and the back side of at least one of the copies is printed with at least one original image, a third format wherein the front side of at least one sheet of the copies is printed with one original image, and the back side of at least one of the copies is printed with multiple original images, receiving user input to select one of the stored formats; and printing the multiple copies in the selected format.

16. The method of claim 15, wherein the computer readable medium is a compact disk.

17. The method of claim 15, wherein the computer readable medium is a DVD.

18. The method of claim 15, wherein the computer readable medium is a floppy disk.

* * * * *